(12) United States Patent
Goshoo et al.

(10) Patent No.: US 6,619,133 B1
(45) Date of Patent: Sep. 16, 2003

(54) SEMICONDUCTOR PRESSURE SENSOR AND ITS MANUFACTURING METHOD

(75) Inventors: Yasuhiro Goshoo, Tokyo (JP); Hirofumi Toujou, Tokyo (JP); Masayuki Yoneda, Tokyo (JP); Takeshi Fukiura, Tokyo (JP)

(73) Assignee: Yamatake Corporation (JP)

( * ) Notice: Subject to any disclaimer, the term of this patent is extended or adjusted under 35 U.S.C. 154(b) by 0 days.

(21) Appl. No.: 09/622,271

(22) PCT Filed: Dec. 2, 1999

(86) PCT No.: PCT/JP99/06751
§ 371 (c)(1),
(2), (4) Date: Nov. 1, 2000

(87) PCT Pub. No.: WO00/34754
PCT Pub. Date: Jun. 15, 2000

(30) Foreign Application Priority Data

Dec. 9, 1998 (JP) .............................. 10-349927

(51) Int. Cl.$^7$ .............................. G01L 9/04; H01L 29/84
(52) U.S. Cl. .............................. 73/754; 73/862; 257/417; 257/419
(58) Field of Search ................... 73/754, 146, 717, 73/727, 862; 438/54, 745, 53; 361/283.1–283.4; 257/417, 419

(56) References Cited

U.S. PATENT DOCUMENTS

| 5,145,810 A | * | 9/1992 | Matsumi ............... 437/228 |
| 5,296,730 A | * | 3/1994 | Takano et al. ............ 257/417 |
| 5,552,347 A | * | 9/1996 | Takano et al. ............ 437/228 |
| 5,770,883 A | * | 6/1998 | Mizuno et al. ............ 257/417 |
| 6,284,670 B1 | * | 9/2001 | Abe et al. .............. 438/745 |

FOREIGN PATENT DOCUMENTS

| EP | 0512771 | 11/1992 |
| JP | 59-038744 | 9/1984 |
| JP | 2-281760 | 11/1990 |
| JP | 3-248474 | 11/1991 |
| JP | 8-116069 | 5/1996 |

* cited by examiner

*Primary Examiner*—Andrew H. Hirshfeld
*Assistant Examiner*—Marissa Ferguson
(74) *Attorney, Agent, or Firm*—Blakely, Sokoloff, Taylor & Zafman

(57) ABSTRACT

That portion of an n-type single-crystal Si layer 1 which corresponds to a pressure-sensitive region is etched to an $SiO_2$ layer 2 by using the $SiO_2$ layer 2 as an etching stopper layer. The $SiO_2$ layer 2 exposed by this etching is removed. The pressure-sensitive region of the n-type single-crystal Si layer 3 is etched by a predetermined amount to form a diaphragm 4. Thus, the $SiO_2$ layer 2 is removed from the diaphragm 4 and a diaphragm edge portion 6.

7 Claims, 3 Drawing Sheets

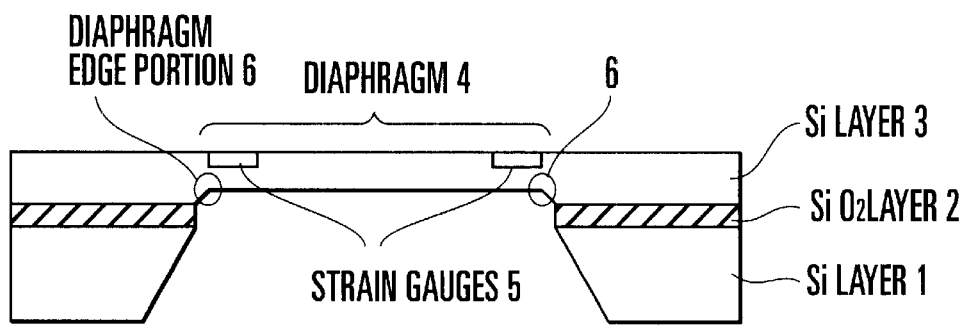
FIG. 1
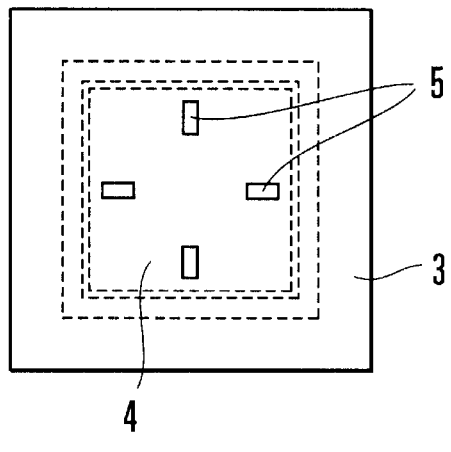
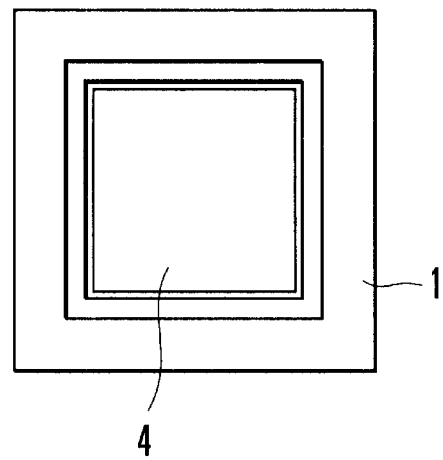
FIG.2A  FIG.2B

SEMICONDUCTOR PRESSURE SENSOR AND ITS MANUFACTURING METHOD

TECHNICAL FIELD

The present invention relates to a semiconductor pressure sensor for measuring a pressure by utilizing the piezoresistive effect of a semiconductor, and a method of manufacturing the same.

BACKGROUND ART

Among various types of pressure sensors, a semiconductor pressure sensor which utilizes the piezoresistive effect of a semiconductor is compact, lightweight, and highly sensitive, and is accordingly widely used in applications such as industrial instrumentation field and medical field. In such a semiconductor pressure sensor, a strain gauge with a piezoresistive effect is formed on a semiconductor diaphragm. The strain gauge is deformed by a pressure applied to the diaphragm, and a change in resistance of the strain gauge caused by the piezoresistive effect is detected, thereby measuring the pressure. The diaphragm is formed by engraving one surface of a semiconductor wafer by etching. The thickness of the diaphragm largely influences the characteristics of the semiconductor pressure sensor. Accordingly, the thickness of the diaphragm must be controlled precisely. In a conventional manufacturing method, however, the etching time and temperature are difficult to control, making it very difficult to control the thickness of the diaphragm and its uniformity at high precision.

A semiconductor pressure sensor has been proposed in which an etching stopper layer made of an insulator or the like is formed in a semiconductor substrate, and the semiconductor substrate is etched to the etching stopper layer, thereby precisely controlling the thickness of the diaphragm (Japanese Patent Publication No. 59-38744). FIG. 4 is a sectional view of the conventional semiconductor pressure sensor disclosed in Japanese Patent Publication No. 59-38744. This semiconductor pressure sensor is comprised of a single-crystal Si layer 11 serving as a base, an $SiO_2$ layer 12 formed on the single-crystal Si layer 11, a single-crystal Si layer 13 formed on the $SiO_2$ layer 12, a diaphragm 14 formed by etching that portion of the single-crystal Si layer 11 which corresponds to the pressure-sensitive region by using the $SiO_2$ layer 12 as an etching stopper layer, and a strain gauge (not shown) with a piezoresistive effect formed on the surface of the single-crystal Si layer 13.

In the semiconductor pressure sensor shown in FIG. 4, the diaphragm 14 undesirably has temperature characteristics due to a difference in coefficient of thermal expansion between the Si layer 13 and $SiO_2$ layer 12. Also, at a diaphragm edge portion 16, cracking occurs in the $SiO_2$ layer 12 more fragile than Si due to deflection of the diaphragm 14. This cracking extends to the Si layer 13 to finally break the diaphragm 14. Even if the exposed $SiO_2$ layer 12 is removed after etching the Si layer 11, since the $SiO_2$ layer 12 remains in the diaphragm edge portion 16, cracking still occurs in an interface between the Si layer 13 and $SiO_2$ layer 12.

The present invention has been made in order to solve these problems, and has as its object to provide a semiconductor pressure sensor in which the temperature characteristics of a diaphragm can be improved and the strength of a diaphragm edge portion can be increased, and a method of manufacturing the same.

DISCLOSURE OF INVENTION

In order to achieve the above object, the present invention comprises a first semiconductor layer forming a base, an insulating layer formed on the first semiconductor layer, a second semiconductor layer formed on the insulating layer and having a diaphragm portion constituting a pressure-sensitive region, and a recess formed in the pressure-sensitive region to extend through the first semiconductor layer and the insulating layer to have a predetermined depth reaching the second semiconductor layer. Hence, the insulating layer does not remain on the diaphragm portion and a diaphragm edge portion.

The present invention also comprises the steps of forming a three-layered structure consisting of a first semiconductor layer forming a base, an insulating layer formed on the first semiconductor layer, and a second semiconductor layer formed on the insulating layer and having a pressure-sensitive region, etching the first semiconductor layer corresponding to the pressure-sensitive region by using the insulating layer as an etching stopper layer, thereby exposing the insulating layer, removing the exposed insulating layer, and etching the second semiconductor layer by a predetermined amount by using the remaining insulating layer as a mask, thereby forming a diaphragm portion at the pressure-sensitive region.

In the present invention, the depth of the recess formed in the second semiconductor layer has an upper allowable limit of ten-odd $\mu m$.

According to one arrangement of the present invention, the second semiconductor layer has a thickness of 30 $\mu m$ and the recess formed in the second semiconductor layer has a depth of 5 $\mu m$ to 10 $\mu m$.

According to one arrangement of the present invention, the first and second semiconductor layers are made of n-type single-crystal Si and the insulating layer is made of $SiO_2$.

One arrangement of the present invention comprises at least one strain gauge formed on the diaphragm portion of the second semiconductor layer.

BRIEF DESCRIPTION OF DRAWINGS

FIG. 1 is a sectional view of a semiconductor pressure sensor according to an embodiment of the present invention;

FIG. 2 shows plan and bottom views of the semiconductor pressure sensor of FIG. 1;

BEST MODE OF CARRYOUT OUT THE INVENTION

Figure 3A:
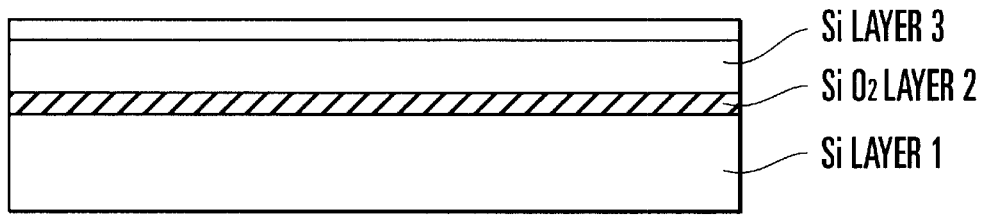
FIG. 3 shows sectional views of the steps in a method of manufacturing the semiconductor pressure sensor of FIG. 1.
Figure 3B:
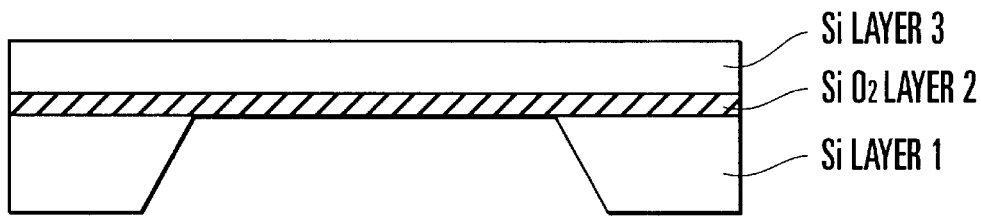

An embodiment of the present invention will be described in detail with reference to the accompanying drawings. FIG. 1 is a sectional view of a semiconductor pressure sensor according to the embodiment of the present invention, FIG. 2(A) is a plan view of the semiconductor pressure sensor of FIG. 1, and FIG. 2(B) is a bottom view of the semiconductor pressure sensor of FIG. 1.

This semiconductor pressure sensor is comprised of an n-type single-crystal Si layer 1 serving as a base, an $SiO_2$ layer 2 formed on the n-type single-crystal Si layer 1, an n-type single-crystal Si layer 3 formed on the $SiO_2$ layer 2, a diaphragm 4 formed by etching that portion of the n-type single-crystal Si layer 1 which corresponds to a pressure-sensitive region to the $SiO_2$ layer 2 by using the $SiO_2$ layer 2 as an etching stopper layer, removing the exposed $SiO_2$ layer 2, and etching the pressure-sensitive region of the n-type single-crystal Si layer 3 by a predetermined amount, and strain gauges 5 with a piezoresistive effect formed on the pressure-sensitive region of the n-type single-crystal Si layer 3.

A method of manufacturing this semiconductor pressure sensor will be described with reference to FIG. 3. First, as shown in FIG. 3(A), an SOI (Silicon On Insulator) wafer constituted by the n-type single-crystal Si layer 1, the SiO$_2$ layer 2 with a thickness of about 0.5 μm, and the n-type single-crystal Si layer 3 is prepared. To fabricate this SOI wafer, an SIMOX (Separation by IMplanted OXygen) technique of forming an SiO$_2$ layer by implanting oxygen into an Si substrate, an SDB (Silicon Direct Bonding) technique of bonding two Si substrates, or other methods may be used.

The n-type single-crystal Si layer 3 is polished to a predetermined thickness (for example, 30 μm) by a polishing method called CCP (Computer Controlled Polishing) or the like in order to planarize and thin it. Alternatively, an n-type single-crystal Si layer 3 having a predetermined thickness may be formed on the SiO$_2$ layer 2 by epitaxy. An SiO$_2$ film or resist (not shown) is formed on the lower surface of the SOI wafer formed in this manner, and an opening is formed in that portion of the SiO$_2$ film or resist which corresponds to a pressure-sensitive region (a region where the diaphragm 4 is to be formed). By using the SiO$_2$ film or resist patterned in this manner as a diaphragm forming etching mask, the n-type single-crystal Si layer 1 is dipped in a solution of KOH or TMAH, thereby etching the n-type single-crystal Si layer 1 (FIG. 3(B)). Etching progresses gradually at the opening described above, and stops automatically upon reaching the SiO$_2$ layer 2.

Figure 3C:
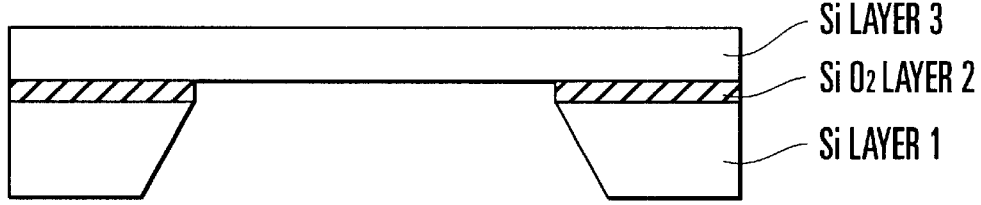
Figure 3D:
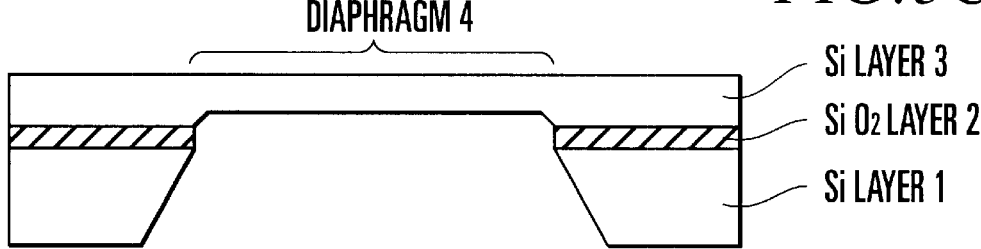
Figure 3E:
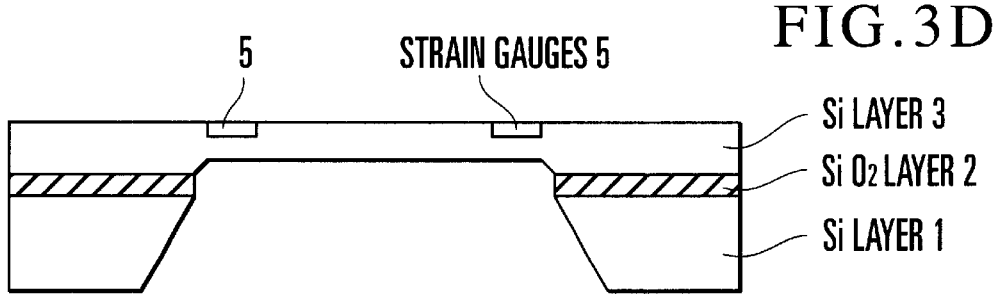
Figure 4:
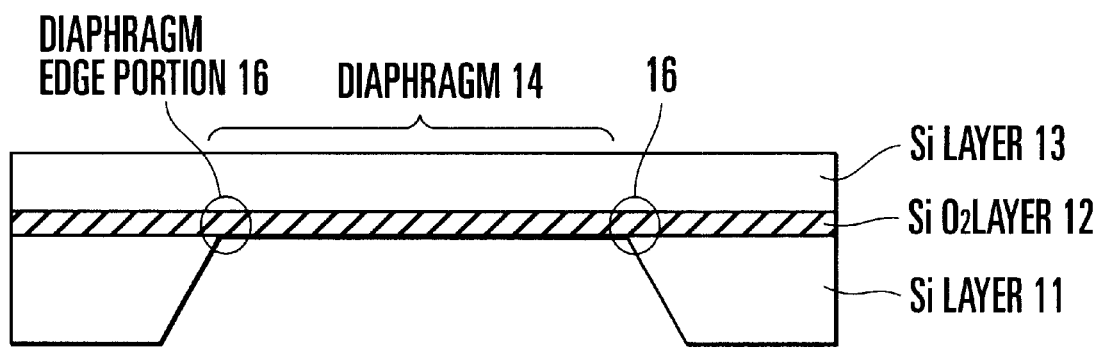
FIG. 4 is a sectional view of a conventional semiconductor pressure sensor.

Subsequently, the SiO$_2$ layer 2 is etched with a solution of HF or the like by using the n-type single-crystal Si layer 1 as an etching mask, to remove the SiO$_2$ layer 2 exposed by etching the Si layer 1 (FIG. 3(C)). By using the SiO$_2$ layer 2 as an etching mask, the n-type single-crystal Si layer 3 is etched with a solution of KOH or TMAH (FIG. 3(D)). The etching depth is controlled to a predetermined small amount (about 5 μm to 10 μm) by time management.

The diaphragm 4 is formed in this manner. Since the etching amount of the n-type single-crystal Si layer 3 is as very small as about 5 μm to 10 μm and the thickness of the n-type single-crystal Si layer 3 does not vary with etching of ten-odd μm or less, the diaphragm 4 can be formed with a uniform thickness. The strain gauges (piezoresistive regions) 5 made of p-Si are formed on the upper surface of the n-type single-crystal Si layer 3 by impurity diffusion or ion implantation (FIG. 3(E)).

Successively, an SiO$_2$ layer (not shown) is formed on the upper surface of the n-type single-crystal Si layer 3, and contact holes are formed in the SiO$_2$ layer on the strain gauges 5. After that, Al electrodes (not shown) are formed on the contact hole portions by vapor deposition in order to obtain electrical contact with the strain gauges 5. Then, the manufacture of the semiconductor pressure sensor is ended.

As described above, that portion of the n-type single-crystal Si layer 1 which corresponds to the pressure-sensitive region is etched from its lower surface to the SiO$_2$ layer 2 by using the SiO$_2$ layer 2 as the etching stopper layer, then the SiO$_2$ layer 2 exposed by this etching is removed, and the pressure-sensitive region of the n-type single-crystal Si layer 3 is etched by a very small amount, so the SiO$_2$ layer 2 will not remain on the diaphragm 4 and a diaphragm edge portion 6. As a result, the temperature characteristics of the diaphragm 4 can be improved, and the strength of the diaphragm edge portion 6 can be increased.

Although anisotropic etching utilizing the crystallographic axis etching characteristics of single-crystal Si is performed in this embodiment, isotropic etching may be performed instead. Dry etching may be performed in place of wet etching as in this embodiment.

INDUSTRIAL APPLICABILITY

The semiconductor pressure sensor according to this invention is suitable as a pressure sensor used in industrial instrumentation field and medical field.

What is claimed is:

1. A semiconductor pressure sensor comprising:
   a first semiconductor layer forming a base;
   an insulating layer formed on said first semiconductor layer;
   a second semiconductor layer formed on said insulating layer and having a diaphragm portion constituting a pressure-sensitive region; and
   a recess formed in said pressure-sensitive region to extend through said first semiconductor layer and said insulating layer reaching said second semiconductor layer such that a diaphragm edge portion is formed at a predetermined depth in said second semiconductor layer.

2. A semiconductor pressure sensor according to claim 1, characterized in that the depth of said recess formed in said second semiconductor layer has an upper allowable limit of ten-odd μm.

3. A semiconductor pressure sensor according to claim 1, characterized in that said second semiconductor layer has a thickness of 30 μm and said recess formed on said second semiconductor layer has a depth of 5 μm to 10 μm.

4. A semiconductor pressure sensor according to claim 1, characterized in that said first and second semiconductor layers are made of n-type single-crystal Si and said insulating layer is made of SiO$_2$.

5. A semiconductor pressure sensor according to claim 1, characterized by comprising at least one strain gauge formed on said diaphragm portion of said second semiconductor layer.

6. A semiconductor pressure sensor according to claim 1, wherein the pressure-sensitive region of the second semiconductor layer has a thickness that is less than the thickness of the second semiconductor layer disposed above the insulating layer.

7. A semiconductor pressure sensor according to claim 1, wherein the first and second semiconductor layers are made of single-crystal Si.

* * * * *